(12) United States Patent
Harui et al.

(10) Patent No.: US 8,013,034 B2
(45) Date of Patent: Sep. 6, 2011

(54) STABLE OFFSET EMULSION INKS CONTAINING WATER TOLERANT EMULSION STABILIZER

(75) Inventors: Nobuo Harui, Ichihara (JP); Hideo Ishii, Tokyo (JP)

(73) Assignee: Sun Chemical Corporation, Parsippany, NJ (US)

( * ) Notice: Subject to any disclaimer, the term of this patent is extended or adjusted under 35 U.S.C. 154(b) by 26 days.

(21) Appl. No.: 11/872,565

(22) Filed: Oct. 15, 2007

(65) Prior Publication Data

US 2008/0134932 A1 Jun. 12, 2008

Related U.S. Application Data

(60) Provisional application No. 60/853,329, filed on Nov. 3, 2006.

(51) Int. Cl.
C09D 11/10 (2006.01)

(52) U.S. Cl. ............... 523/160; 106/31.25; 106/31.26

(58) Field of Classification Search ................ 523/160; 106/31.25, 31.26
See application file for complete search history.

(56) References Cited

U.S. PATENT DOCUMENTS

| | | | |
|---|---|---|---|
| 2,893,886 A | 7/1959 | Erskine et al. | |
| 3,293,201 A | 12/1966 | Shahade et al. | |
| 3,629,119 A | 12/1971 | Weaver | |
| 3,719,623 A | 3/1973 | Blank | |
| 3,960,935 A | 6/1976 | Samour | |
| 4,428,855 A | 1/1984 | Law et al. | |
| 5,319,052 A | 6/1994 | Prantl et al. | |
| 5,417,749 A * | 5/1995 | Krishnan et al. | 524/377 |
| 5,800,599 A | 9/1998 | Asada | |
| 5,981,625 A | 11/1999 | Zou et al. | |
| 6,011,083 A | 1/2000 | Okuda et al. | |
| 6,149,720 A | 11/2000 | Asada et al. | |
| 6,348,519 B1 * | 2/2002 | Ohshima et al. | 523/161 |
| 6,544,322 B2 | 4/2003 | McCall et al. | |
| 6,709,503 B1 * | 3/2004 | Krishnan et al. | 106/31.66 |
| 6,858,678 B2 | 2/2005 | Andrist et al. | |
| 7,008,474 B2 | 3/2006 | Konno et al. | |
| 2002/0107309 A1 | 8/2002 | Malanga et al. | |
| 2004/0040468 A1 | 3/2004 | Nomura et al. | |
| 2004/0194658 A1 | 10/2004 | Konno et al. | |
| 2008/0139831 A1 | 6/2008 | Harui et al. | |

FOREIGN PATENT DOCUMENTS

| | | |
|---|---|---|
| CN | 1691895 A | 11/2005 |
| GB | 2408050 | 5/2005 |
| WO | 2004/058904 A1 | 7/2004 |
| WO | 2005/044934 A1 | 5/2005 |
| WO | WO 2005044934 A1 * | 5/2005 |
| WO | WO 2005113694 A1 * | 12/2005 |
| WO | 2006/028649 A2 | 3/2006 |
| WO | WO 2006028649 A2 * | 3/2006 |
| WO | WO 2008/045578 | 4/2008 |
| WO | WO 2008/048590 | 4/2008 |

OTHER PUBLICATIONS

International Search Report and Written Opinion of the International Searching Authority issued for related PCT International application No. PCT/US07/22057; Mar. 3, 2008.
International Search Report and Written Opinion of the International Searching Authority issued for related PCT International application No. PCT/US07/22056; Feb. 25, 2008.
International Search Report and Written Opinion of the International Searching Authority issued for related PCT International application No. PCT/US07/81418; Mar. 7, 2008.
International Search Report and Written Opinion of the International Searching Authority issued for related PCT International application No. PCT/US07/81422; Mar. 7, 2008.
Office Action dated Apr. 21, 2006, U.S. Appl. No. 11/872,559, filed Oct. 15, 2007, Inventor Nobuo Harui.
Office Action dated Sep. 29, 2009, U.S. Appl. No. 11/872,559, filed Oct. 15, 2007, Inventor Harui et al.
Office Action dated Sep. 29, 2010, U.S. Appl. No. 11/872,559, filed Oct. 15, 2007, Inventor Harui et al. (previously cited by Applicant in Oct. 24, 2010 IDS as Office Action dated Sep. 29, 2009—typographical error).

* cited by examiner

Primary Examiner — David W Wu
Assistant Examiner — Vu A Nguyen
(74) Attorney, Agent, or Firm — McKenna Long & Aldridge, LLP.

(57) ABSTRACT

A printing ink is disclosed containing: an emulsion stabilizer having a water tolerance value of between more than about 1.0 and equal or less than about 11.0 and water as a dispersed phase, wherein said emulsion stabilizer stabilizes the water to form a stabilized emulsion printing ink.

15 Claims, No Drawings

STABLE OFFSET EMULSION INKS CONTAINING WATER TOLERANT EMULSION STABILIZER

PRIOR APPLICATIONS

This application claims benefit of the U.S. provisional application Ser. No. 60/853,329, filed Nov. 3, 2006, the contents of which are incorporated herein by reference.

FIELD OF THE INVENTION

The invention relates to a stabilized emulsion printing ink containing an emulsion stabilizer having a water tolerance value of between more than about 1.0 and equal or less than about 11.0.

BACKGROUND OF THE INVENTION

Historically, lithographic web offset heat set inks contain between 30% and 45% volatile organic compounds (VOC). Besides being detrimental to the environment, VOCs are also flammable and hazardous to the printers who operate the press. Thus, it is desirable to reduce the VOC content in lithographic web offset heat set inks as much as possible. Initial attempts at solving this problem involved the use of chemical reactions that were triggered in a press oven. However, such oven cured ink systems did not have shelf stability.

Therefore, a heat setting web offset ink will typically contain the following major components (a) a high molecular weight ink resin to disperse the pigment and also to provide the toughness and gloss the ink requires on drying, (b) solvents to provide the fluidity to the ink before it is placed on the web and dried in an oven, (c) pigment, and (d) other minor components such as gellants, which provide structure to the ink, plasticizers (non volatile solvents), waxes, thickeners, and antioxidants. Conventional heatset inks set or dry by evaporation of the ink oil on heating at 250 to 300° F., and, to some degree, by penetration of the ink oil into the paper, leaving behind a hard polymeric film.

EP 731150 and EP 960911 describes rapid thermosetting low VOC web offset lithographic ink systems comprising solid resin, drying oil alkyds, bodied drying oil, vegetable oil, fatty acids, multifunctional unsaturated polyester, reducing agents and transition metal salts of organic acids and may also include an aqueous fountain solution containing peroxides that promote free radical polymerization of the ink.

WO 96/34922, U.S. Pat. No. 5,431,721, and U.S. Pat. No. 5,545,741, 1996 respectively describe lithographic inks which employ non-volatile solvents, but they set by penetration of the non-volatile solvent into the stock.

U.S. Pat. No. 7,018,453 describes a low VOC web offset heat set inks that contain a latex polymer. Due to its inherent incompatibility the gloss of printed film is dramatically reduced and at high speed piling occurs.

WO 2005/113694 describes an emulsion composition comprising water, a hydrocarbon distillate having a boiling point of 215 to 235° C., and a surfactant having a hydrophilic lipophilic balance number of 10 or less. However, the surfactant described in WO 2005/113694 is monomeric and the stability of the emulsified composition is not very good.

U.S. Pat. No. 5,417,749 describes a printing ink useful for "waterless" printing processes comprising a water-in-oil microemulsion wherein the water is present in an amount of about 5 to 20 wt. %, based on the weight of the ink. The water phase contains about 0.5 to 3 wt. %, based on the weight of the ink, of a water soluble surfactant which will not lower the surface tension (as measured at ambient temperature) of the ink.

In summary, traditional offset inks have high Volatile Organic Content (VOC) levels. The addition of water to the ink during manufacturing is one way to reduce the VOC level. However, prior attempts to emulsify water and reduce VOC content has been hampered by poor stability of the emulsified ink. Accordingly, there is a desire to develop better technology to stabilize pre-emulsified water in low VOC web offset heat set and offset inks that have good shelf stability and high dry speed.

SUMMARY OF THE INVENTION

The present invention provides a printing ink comprising:
(a) an emulsion stabilizer having a water tolerance value of between more than about 1.0 and equal or less than about 11.0; and
(b) water as a dispersed phase,
wherein said emulsion stabilizer stabilizes the water to form a stabilized emulsion printing ink.

The present invention also provides an emulsion heatset printing ink comprising;
(a) a VOC content of less than about 35% by weight;
(b) water from about 5 to 50% by weight of the ink; and
(c) an emulsion stabilizer having a water tolerance value of between more than about 1.0 and equal or less than about 11.0,
wherein said ink does not contain a latex polymer.

Other objects and advantages of the present invention will become apparent from the following description and appended claims.

DETAILED DESCRIPTION OF THE INVENTION

It has been surprisingly discovered that incorporation of water via micro emulsions enable reduction of VOCs by up to 50%. The micro emulsion was surprisingly achieved with a novel emulsion stabilizer having a water tolerance value of between more than about 1.0 and equal or less than about 11.0.

This new class of emulsion stabilizer promotes water-in-oil emulsion stability for pre-emulsified inks, in particular heatset and offset inks. Preferably, the emulsion stabilizers are prepared by reacting unsaturated oils and/or polymerized/bodied unsaturated oils with maleic anhydride (preferably 4-5 wt. %), and are subsequently reacted, partially or totally, with an amine or alcohol to form an amide or ester, respectively.

Preferably, the unsaturated oil and/or polymerized/bodied unsaturated oil is selected from the group consisting of linseed oil, polymerized linseed oil, soy oil, soy fatty acid ester, dehydrated castor fatty acid ester. Most preferably, the unsaturated oil is polymerized linseed oil.

Preferably, the amine is selected from the group consisting of ethanolamine, diethylamine, isobutylamine, octyleamine, morpholine, benzylamine and aniline. Also preferably, the alcohol is tridecylalcohol.

Preferably, the stabilized emulsion printing ink of the present invention comprises water of more than 20% by weight, more preferably from about 5 to about 50% by weight, again more preferably from about 5 to about 20% by weight, and most preferably from about 5 to about 15% by weight of the ink.

Also preferably, a printing ink containing the emulsion stabilizer of the present invention is a lithographic water-inoil microemulsion printing ink having a viscosity between about 30 and about 300 poise and VOC content of less than about 35% by weight, more preferably less than about 20% by weight. The amount of emulsion stabilizer present in the printing ink is preferably less than about 5% by weight, more preferably from about 1 to 3% by weight. Also preferably, the printing ink of the present invention does not contain a latex polymer.

The emulsion stabilizer can be produced by the above mentioned procedure provided that any unsaturated oil or polymerized oil is used and at least one of the following is used:

1. A secondary monoamine or monoalcohol;
2. A primary monoamine or monoalcohol;
3. A cyclic secondary monoamine is used; or
4. An aromatic primary monoamine or monoalcohol.

The addition of the emulsion stabilizer has another advantage when used in letterpress inks. Letterpress inks are printed directly onto the paper, that is, neat inks are applied to the paper. The addition of water to the ink will absorb into the paper causing the paper fibers to swell. This swelling of the paper fibers affects the ink/paper interaction such that the printed image will appear smoother and sharper resembling offset printed inks. The purpose of the emulsion stabilizer is to prevent the water from evaporating as the ink travels along the roller train.

Water Soluble Polymers

The printing ink containing the emulsion stabilizer may optionally contain a water-soluble polymer. Examples of suitable modified polymers which are soluble in the water phase of the ink regardless of the pH of the water phase include: carboxymethylcellulose, hydroxyethylcellulose, hydroxypropyl-cellulose, hydroxybutylmethylcellulose, poly(C1, —C4) alkylene oxides, polyethyleneimine, polyvinyl alcohol, polyvinyl acetate, polyvinylpyrollidone, polyvinyl-oxazolidone and polyacrylamide polymers.

Gums is a class of widely used water-soluble polymers. Gums consist of polysaccharides with varying polymerization degrees. They include the polysaccharide hydrocolloids, which are usually prepared from gums, and they may have been chemically modified, e.g. by partial acetylation, to make them more water-soluble and/or stable in the presence of the other ingredients in the liquid media. Biopolymers also belonging to this class of polysaccharide hydrocolloids. Typical examples of commercially available, gum-type thickening agents are xanthan gums and their derivatives. These include a partially acetylated xanthan gum, KELZAN ex Kelco Company of N.J., USA, SHELLFLO-XA and ENORFLO-XA, xanthan gums ex Shell Chemicals Ltd., and Rhodapol, a xanthan gum ex Rhone-Poulenc SA. Another example is the biopolymer Shellflo S, a succinoglucan ex Shell Chemicals Ltd. Yet other gum-type thickening agents are those derived from guar gums, such as the JAGUAR® products ex Stein, Hall and Co Inc. Further we include Agent AT 2001, Rhodopol 23 and 23 P, Jaguar 8600 and 418 which have good solubility in water/solvent mixtures as well provided by Rhodia. Other types such as Jaguar 308 NB, Jaguar 2700, Jaguar 8000, Jaguar HP-120 are also included.

A further type of water soluble polymers are METHOCEL and ETHOCEL cellulose ether products. These are available in two basic types: methylcellulose and hydroxypropyl methylcellulose. Both METHOCEL types have the polymeric backbone of cellulose, a natural carbohydrate that contains a basic repeating structure of anhydroglucose units. During the manufacture of cellulose ethers, cellulose fibers are treated with methyl chloride, yielding the methyl ether of cellulose. These are METHOCEL A brand products. For hydroxypropyl methylcellulose products (METHOCEL E, F, J, and K brand products), propylene oxide is used in addition to methyl chloride to obtain hydroxypropyl substitution on the anhydroglucose units. This substituent group, —OCH2CH(OH)CH3-, contains a secondary hydroxyl on the number two carbon and may also be considered to form a propylene glycol ether of cellulose. These products possess varying ratios of hydroxypropyl and methyl substitution, a factor which influences organic solubility and the thermal gelation temperature of aqueous solutions.

ETHOCEL ethylcellulose polymers are derived from and have the polymeric "backbone" of cellulose, which is a naturally occurring polymer. The molecule has a structure of repeating anhydroglucose units. Note that each anhydroglucose unit (ring) has three reactive —OH (hydroxyl) sites. Cellulose is treated with an alkaline solution to produce alkali cellulose, which is subsequently reacted with ethyl chloride, yielding crude ethylcellulose. Specific properties of the various ETHOCEL polymers are determined by the number of anhydroglucose units in the polymer chain and the degree of ethoxyl substitution.

CELLOSIZE HEC polymers are named after their two components: cellulose and hydroxyethyl side chains. Cellulose itself is a water-insoluble, long-chain molecule consisting of repeating anhydroglucose units. In the manufacture of CELLOSIZE HEC, a purified cellulose is reacted with sodium hydroxide to produce a swollen alkali cellulose. This alkali-treated cellulose is more chemically reactive than cellulose. By reacting the alkali cellulose with ethylene oxide, a series of hydroxyethyl cellulose ethers is produced. In this reaction, the hydrogen atoms in the hydroxyl groups of cellulose are replaced by hydroxyethyl groups, which confer water solubility to the product.

Finally another group of well-known, suitable organic polymers, include acrylate homo- or copolymers and derivatives thereof. Typical examples of such materials which are suitably cross-linked are the acrylic copolymers sold by National Starch and Chemical Ltd under the trade names EP 1910 and PPE 1042 or Ultrasperse Starches. Other types of such (meth)acrylic homo- and copolymers are certain Carbopol®-type, cross-linked carboxyvinyl polymers such as CARBOPOL®-940 ex B. F. Goodrich Co Ltd. Other examples are the Viscalex products ex Allied Colloids, which are emulsions of (meth)acrylic acid copolymers with (meth) acrylate esters, e.g. VISCALEX HV 30, ACRYSOLS (ex Rohm & Haas) and UBATOLS (ex Stapol).

Evaluation of Emulsion Stabilizers by Shearing Followed by Visual Assessment Overtime The emulsion stabilizers or non-water soluble polymeric surfactants of the present invention were evaluated by shearing a weighed quantity of the emulsion stabilizer in a jar using a mixer at high speed. A weighed quantity of water was then pipetted into the mixing solution and further sheared for 10 minutes. The emulsion was than transferred into a vial and capped. A visual assessment is made periodically for water/ oil separation and color. The ratings of these sheared/mixed emulsions were based on whether the emulsion is stable for a least one week and the color. A whitish color has been determined to be more desirable due to the smaller particle size which provides a more stable emulsion. An emulsion stabilizer is classified as excellent if there is no separation of the emulsion after one week and is white in color. An emulsion stabilizer is classified as good if there is no separation of the emulsion after one week and is tan or brown in color. An emulsion stabilizer is classified as acceptable if there is no separation of the emulsion after 3-5 days. Any separation that takes place in less than 3 days is considered poor.

Testing of Emulsified Ink Using Microscope

Emulsified ink (5 mg) was put on a slide glass, and another slide glass was piled on it. The ink was observed at a magnifying power of 450 and drops of water may be observed.

| Maximum diameter of drops is more than 13 micrometer | ×not acceptable |
|---|---|
| Maximum diameter of drops is between 5 and 13 micrometer | Δacceptable |
| Maximum diameter of drops is less than 5 micrometer | ○good |
| Almost no drops in the ink | ⊚excellent |

Testing of Emulsified Ink Using Hoover Muller

Emulsified ink (1.0 g) was put on a Hoover Muller. At a weight of 1.1 kilogram, ink was milled for 100 rotations. Milled ink was scraped with a ink knife and the ink was observed as follows:

| A lot of water is separated | ×not acceptable |
|---|---|
| Small drops of water are seen | Δacceptable |
| Almost no drops of water are seen | ○good |

Method of Measuring Water Tolerance Value of Emulsion Stabilizer (Emulsifier)

Emulsifier (0.5 g) was dissolved in 10 ml of THF, and put in 50 ml beaker. Water was dropped in the beaker until the solution becomes cloudy. Water tolerance is the weight of water dropped when the solution becomes cloudy. Large water tolerance means that the emulsifier is more hydrophilic.

Example 1

Preparation and Testing of Emulsion Stabilizer 1-1

Polymerized linseed oil (86.1 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. and diethylamine (9.8 parts) was added over 90 minutes and held for one hour after the addition. After the one hour hold, the temperature was raised to 205° C. The batch was held at this temperature until there is a zero amine value and an acid value of 23-27. When the amine value was zero and the acid value 23-27, the batch was cooled to 140° C., then discharged. The water tolerance value of the emulsion stabilizer produced was measured as indicated hereinabove at 1.1.

The emulsion stabilizer prepared was evaluated by shearing a weighed quantity of the emulsion stabilizer in a jar using a mixer at high speed as described above. It produced good to excellent stable emulsions.

Example 2

Preparation and Testing of Emulsion Stabilizer 2-1

Polymerized linseed oil (90.4 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline was mixed. When a red color appeared, free maleic anhydride was present and the reaction was further held. When there was no color change, the reaction proceeded to the next step.

The batch was then cooled to 120° C. At 120° C., isobutylamine (5.5 parts) was added over 90 minutes and held for one hour after the addition. After the one hour hold, the temperature was raised to 205° C. The batch was held at this temperature until there was a zero amine value and an acid value of 23-27. When the amine value was zero and the acid value 23-27, the batch was cooled to 140° C., then discharged. The water tolerance value of the emulsion stabilizer produced was measured as indicated hereinabove at 1.3.

The emulsion stabilizer prepared was evaluated by shearing a weighed quantity of the emulsion stabilizer in a jar using a mixer at high speed as described above. It produced good to excellent stable emulsions.

Example 3

Preparation and Testing of Emulsion Stabilizer 3-1

Polymerized linseed oil (91.7 parts) was charged into a four-neck round bottom flask and heated to 205° C. under a nitrogen blanket. To this, maleic anhydride (4.3 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. At 120° C., morpholine (4.0 parts) was added over 90 minutes and held for one hour after the addition. After the one hour hold, the temperature was raised to 205° C. The batch was held at this temperature until there is a zero amine value and an acid value of 23-27. When the amine value reached zero and the acid value 23-27, the batch was cooled to 140° C., then discharged. The water tolerance value of the emulsion stabilizer produced was measured as indicated hereinabove at 1.3.

The emulsion stabilizer prepared was evaluated by shearing a weighed quantity of the emulsion stabilizer in a jar using a mixer at high speed as described above. It produced good to excellent stable emulsions.

Example 4

Preparation and Testing of Emulsion Stabilizer 4-1

Polymerized linseed oil (90.4 parts) was charged into a four-neck round bottom flask and heated to 205° C. under a nitrogen blanket. To this, maleic anhydride (4.1 parts) was added. This mixture was held for one hour. After one hour a sample of the mixture was withdrawn from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was cooled to 120° C. At 120° C., diethylamine (5.5 parts) was added over 90 minutes and held for one hour after the addition. After the one hour hold, the temperature was raised to 205° C. The batch was held at this temperature until there was a zero amine value and an acid value of 23-27. When the amine value was zero and the acid value is 23-27, the batch was cooled to 140° C., then discharged. The water tolerance value of the emulsion stabilizer produced was measured as indicated hereinabove at 1.2.

The emulsion stabilizer prepared was evaluated by shearing a weighed quantity of the emulsion stabilizer in a jar using a mixer at high speed as described above. It produced good to excellent stable emulsions. In addition, it has been field trialed in an ink and found to work quite well.

Example 5

(1) Preparation of Emulsion Stabilizers 5-1 to 5-34

Emulsion Stabilizers 5-1, 5-2 and 5-34

Emulsion stabilizer 5-1 is a commercial surfactant (Kao Corporation). Emulsion stabilizer 5-2 is a commercial surfactant (DAI-ICHI KOGYO SEIYAKU CO., LTD.). Emulsion Stabilizer 5-34 is a soybean isophtalic alkyd (DAINIPPON INK AND CHEMICALS, INCORPORATED).

Emulsion Stabilizers 5-3 to 5-26, 5-28 to 5-33

Emulsion Stabilizers 5-3 to 5-26, 5-32 and 5-33 were made by the same synthetic method as described in Example 3. The emulsion stabilizers, numbered 5-28 to 5-31, were made from monglyceride and diglyceride. The amines or alcohol were charged in the flask below their boiling point. The target of each acid value is shown in Table 2.

Emulsion Stabilizer 5-27

Linseed oil (70 parts) and polyoxyethylene-trimethylpropane ether (24 parts) were charged into a four-neck round bottom flask and heated to 220° C. This mixture is made to react to the five or less acid value. After the acid value was measured at five or less, the batch was then cooled to 160° C. To this, maleic anhydride (3 parts) was added. This mixture was held for one hour. After one hour a sample of the mixture was withdraw from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. At 120° C., morpholine (3 parts) was added over 90 minutes and held for one hour after the addition. After the one hour hold, the temperature was raised to 205° C. The batch was held at this temperature until there is zero amine value and an acid value of 12-16. When the amine value reached zero and the acid value 12-16, the batch was cooled to 140° C., then discharged.

Emulsion Stabilizer 5-28

Linseed oil (76 parts) and glycerol (4 parts) were charged into a four-neck round bottom flask and heated to 240° C. This mixture was kept at 240° C. for 2 hours to exchange the ester with catalyst. After the ester exchange, the batch, which was diglyceride, was cooled to 160° C. To this, maleic anhydride (14 parts) was added. This mixture was held for one hour. After one hour a sample of the mixture was withdraw from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. At 120° C., morpholine (6 parts) was added over 90 minutes and held for one hour after the addition. After the one hour hold, the temperature was raised to 205° C. The batch was held at this temperature until there is zero amine value and an acid value of 31-35. When the amine value reached zero and the acid value 31-35, the batch was cooled to 140° C., then discharged.

Emulsion Stabilizer 5-29

Linseed oil (43 parts) and glycerol (9 parts) were charged into a four-neck round bottom flask and heated to 240° C. This mixture was kept at 240° C. for 2 hours to exchange the ester with catalyst. After the ester exchange, the batch, which was mono-glyceride, was cooled to 160° C. To this, maleic anhydride (30 parts) was added. This mixture was held for one hour. After one hour a sample of the mixture was withdraw from the flask and placed on a glass plate with white paper under it. To this sample, 2 drops of N,N-dimethylaniline were added. The sample and N,N-dimethylaniline were mixed. When a red color appeared, free maleic anhydride was present and the reaction was further held. When there was no color change, the reaction proceeded to the next step.

The batch was then cooled to 120° C. At 120° C., morpholine (18 parts) was added over 90 minutes and held for one hour after the addition. After the one hour hold, the temperature was raised to 205° C. The batch was held at this temperature until there was zero amine value and an acid value of 43-47. When the amine value reached zero and the acid value 43-47, the batch was cooled to 140° C., then discharged.

Table 1 describes the identity of the emulsion stabilizer as well as the ingredients used in preparing said emulsion stabilizers.

TABLE 1

| | | Oil Type | | Reactive Point MA n/oil | | wt | Amine or Alcohol | |
|---|---|---|---|---|---|---|---|---|
| | | | wt % | | wt. ratio | % | | wt % |
| Emulsion stabilizer | 5-1 | | | RO(CH$_2$CH$_2$O)nH Polyoxyethylene glycol ether | | | | |
| | 5-2 | | | Polyoxyethylene(20) sorbitan monooleate | | | | |
| Emulsion Stabilizer | 3-1 | Polymerized Linseed Oil (Poly LO) | 91.7 | Maleic anhydride (MA n) | (MA n/oil)* | 4.3 | Morpholine | 4.0 |
| | 5-3 | Varnish No. 3 | 92 | | (MA n/oil)* × 0.9 | 4 | | 4 |
| | 5-4 | (Poly LO) | 88 | | (MA n/oil)* × 1.0 | 4 | | 8 |
| | 5-5 | | 93 | | (MA n/oil)* × 0.9 | 4 | Ethanolamine | 3 |

TABLE 1-continued

| | Oil Type | | Reactive Point MA n/oil | wt | Amine or Alcohol | |
|---|---|---|---|---|---|---|
| | | wt % | wt. ratio | % | | wt % |
| 5-6 | | 94 | (MA n/oil)* × 0.7 | 3 | Morpholine | 3 |
| 5-7 | | 96 | (MA n/oil)* × 0.4 | 2 | | 2 |
| 5-8 | | 98 | (MA n/oil)* × 0.0 | 0 | | 2 |
| 5-9 | Varnish No. 4 (Poly LO) | 92 | (MA n/oil)* × 0.9 | 4 | | 4 |
| 5-10 | Varnish No. 5 (Poly LO) | 92 | | 4 | | 4 |
| 5-11 | Varnish No. 6 (Poly LO) | 92 | | 4 | | 4 |
| 5-12 | Varnish No. 7 (Poly LO) | 92 | | 4 | | 4 |
| 5-13 | Linseed Oil | 92 | | 4 | | 4 |
| 5-14 | (LO) | 80 | (MA n/oil)* × 2.9 | 11 | | 9 |
| 5-15 | | 72 | (MA n/oil)* × 4.4 | 15 | | 13 |
| 5-16 | | 56 | (MA n/oil)* × 7.2 | 19 | | 25 |
| 5-17 | | 91 | (MA n/oil)* × 0.9 | 4 | Benzylamine | 5 |
| 5-18 | | 93 | | 4 | Ethanolamine | 3 |
| 5-19 | Soybean Oil | 92 | | 4 | Morpholine | 4 |
| 5-20 | Varnish No. 6 (Poly LO) | 54 | (MA n/oil)* × 7.1 | 18 | | 28 |
| 5-21 | Linseed Oil | 49 | (MA n/oil)* × 9.6 | 22 | | 29 |
| 5-22 | Linseed Oil | 44 | (MA n/oil)* × 11.6 | 24 | | 32 |
| 5-23 | Linseed Oil | 51 | (MA n/oil)* × 7.1 | 17 | Laurylamine | 32 |
| 5-24 | | 44 | (MA n/oil)* × 7.3 | 15 | Stearylamine | 41 |
| 5-25 | | 58 | (MA n/oil)* × 7.0 | 19 | Morpholine FARMIN 20D | 12 11 |
| 5-26 | | 95 | (MA n/oil)* × 0.4 | 2 | Morpholine | 3 |
| 5-27 | LO EthyleneOxide ester | 94 | — | 3 | | 3 |
| 5-28 | LO diglyceride | 80 | — | 14 | | 6 |
| 5-29 | LO | 52 | — | 30 | | 18 |
| 5-30 | monoglyceride | 51 | — | 30 | | 19 |
| 5-31 | | 51 | — | 29 | | 20 |
| 5-32 | Varnish No. 3 (Poly LO) | 90 | (MA n/oil)* × 0.9 | 4 | Dibutylamine | 6 |
| 5-33 | Varnish No. 6 (Poly LO) | 87 | (MA n/oil)* × 1.0 | 4 | Tridecylalchol | 9 |
| 5-34 | | | Soybaen Isophtalic Alkyd | | | |
| 5-35 | | | Polymerized Linseed Oil | | | |
| 5-36 | | | No Surfactant | | | |

*MAn/oil wt. ratio means the weight ratio of maleic anhydride to unsaturated-/polymerized/bodied oil. Values for MAn/oil wt are indicated as Xvalue which are multiples of the standard value for Emulsion stabilizer 3-1. For the standard emulsion stabilizer 3-1, polymerized linseed oil(poly LO) is 91.7 wt %, and maleic anhydride(MAn) is 4.3 wt %. Accordingly, the MAn/oil is 4.3/91.7 (=0.0469), and it is specified as (MAn/oil)*.

(2) Preparation of Emulsified Inks

Emulsified ink formulations were prepared containing an emulsion stabilizer as described in Table 1 and other components as follows:

| | |
|---|---|
| Standard web offset ink (Web world New Advan yellow (N type)) | 94 parts |
| emulsion stabilizer (see Table 1) | 1 part |
| water | 5 parts |

The total parts of each ink formulation was mixed well by using laboratory mixer at 6000 rpm for 10 minutes, and emulsified ink was obtained.

Table 2 shows the testing results of emulsified inks using microscope and Hoover Muller tests as described previously. Table 2 also contains the results of water tolerance testing of each emulsion stabilizer as described previously.

TABLE 2

| | | targeted acid value | Water tolerance | Microscope Water Size | Result | Hoover Muller Water Separation |
|---|---|---|---|---|---|---|
| Emulsion Stabilizer | 5-1 | — | 13.9 | 6.3 | Δ | X |
| | 5-2 | — | 11.2 | 4.8 | ○ | X |
| Emulsion Stabilizer | 3-1 | 23-27 | 1.3 | Invisible | ⊚ | Δ |
| | 5-3 | 29-33 | 1.4 | 8.3 | Δ | ○ |
| | 5-4 | 22-26 | 1.8 | 10.0 | Δ | ○ |
| | 5-5 | 20-24 | 1.3 | 5.0 | Δ | Δ |
| | 5-6 | 23-27 | 1.2 | 5.1 | Δ | ○ |
| | 5-7 | 17-21 | 1.2 | 9.1 | Δ | ○ |
| | 5-8 | 8-12 | 1.1 | 12.2 | Δ | ○ |
| | 5-9 | 27-31 | 1.5 | Invisible | ⊚ | ○ |
| | 5-10 | 26-30 | 1.6 | 8.4 | Δ | ○ |
| | 5-11 | 22-26 | 1.7 | 8.7 | Δ | ○ |
| | 5-12 | 20-24 | 2.2 | 3.3 | ○ | ○ |
| | 5-13 | 16-20 | 2.4 | 2.2 | ○ | ○ |
| | 5-14 | 42-46 | 2.7 | 7.3 | Δ | ○ |

TABLE 2-continued

| | targeted acid value | Water tolerance | Microscope Water Size | Result | Hoover Muller Water Separation |
|---|---|---|---|---|---|
| 5-15 | 51-55 | 3.4 | 6.1 | Δ | ○ |
| 5-16 | 59-63 | 6.9 | 2.2 | ○ | ○ |
| 5-17 | 21-25 | 2.2 | 13.0 | Δ | ○ |
| 5-18 | 15-19 | 2.4 | 11.1 | Δ | ○ |
| 5-19 | 17-21 | 2.2 | 12.2 | Δ | ○ |
| 5-20 | 31-35 | 7.9 | 5.5 | Δ | Δ |
| 5-21 | 58-62 | 9.8 | 4.2 | ○ | ○ |
| 5-22 | 62-66 | 10.8 | 3.9 | ○ | ○ |
| 5-23 | 21-25 | 2.0 | 3.3 | Δ | ○ |
| 5-24 | 20-24 | 1.4 | 2.4 | ○ | ○ |
| 5-25 | 55-59 | 2.9 | 2.8 | ○ | ○ |
| 5-26 | 7-11 | 2.2 | 4.4 | ○ | ○ |
| 5-27 | 12-16 | 2.3 | 8.1 | Δ | Δ |
| 5-28 | 31-35 | 2.5 | 5.3 | Δ | Δ |
| 5-29 | 43-47 | 3.3 | 6.7 | Δ | ○ |
| 5-30 | 30-34 | 3.5 | 4.0 | ○ | ○ |
| 5-31 | 29-33 | 3.6 | 9.7 | Δ | Δ |
| 5-32 | 25-29 | 1.0 | 9.3 | Δ | ○ |
| 5-33 | 29-33 | 1.1 | 7.3 | Δ | Δ |
| 5-34 | — | 0.9 | 6.3 | Δ | X |
| 5-35 | — | 0.9 | 16.3 | X | X |
| 5-36 | — | — | 16~20 | X | X |

As indicated hereinabove, water size by microscope indicates the degree of emulsification. The smaller the water size is, the more the water is finely emulsified in ink. Table 2 shows that emulsion stabilizers with a water tolerance value in the claimed range make the water size smaller an allow for passing of the Hover Muller water separation test.

The invention has been described in terms of preferred embodiments thereof, but is more broadly applicable as will be understood by those skilled in the art. The scope of the invention is only limited by the following claims.

What is claimed is:

1. A printing ink comprising:
   (a) an emulsion stabilizer having a water tolerance value of between more than about 1.0 and equal or less than about 11.0, said emulsion stabilizer present in the printing ink from about 1 to 3% by weight;
   (b) water as a dispersed phase, wherein said emulsion stabilizer stabilizes the water to form a stabilized emulsion printing ink;
   (c) a water soluble polymer, and
   (d) a VOC content of less than about 35% by weight.

2. The printing ink of claim 1, wherein said water phase is from about 5 to 50% by weight of the ink.

3. The printing ink of claim 1, wherein said water phase is from about 5 to 20% by weight of the ink.

4. The printing ink of claim 1, wherein said water phase is from about 10 to 15% by weight of the ink.

5. The printing ink of claim 1, wherein said emulsion stabilizer is prepared by reacting an unsaturated oil and/or polymerized/bodied unsaturated oil with maleic anhydride followed by a further partial or complete reaction with an amine to form an amide.

6. The printing ink of claim 1, wherein said emulsion stabilizer is made by reacting unsaturated oil and/or polymerized/bodied unsaturated oil with maleic anhydride followed by a further partial or complete reaction with an alcohol to form an ester.

7. An emulsion heatset printing ink comprising;
   (a) a VOC content of less than about 35% by weight;
   (b) water from about 5 to 50% by weight of the ink;
   (c) a water soluble polymer, and
   (d) an emulsion stabilizer having a water tolerance value of between more than about 1.0 and equal or less than about 11.0, said emulsion stabilizer present in the printing ink from about 1 to 3% by weight of the ink, wherein said ink does not contain a latex polymer.

8. The printing ink of claim 7 being a lithographic printing ink.

9. The printing ink of claim 7, wherein said VOC content is less than about 15% by weight of the ink.

10. The printing ink of claim 7, wherein said VOC content is less than about 10% by weight of the ink.

11. The printing ink of claim 7, wherein said VOC content is less than about 5% by weight of the ink.

12. The printing ink of claim 7 being a water-in-oil microemulsion printing ink.

13. The printing ink of claim 7 having a viscosity between about 30 and about 300 poise.

14. The printing ink of claim 7, wherein said emulsion stabilizer is prepared by reacting an unsaturated oil and/or polymerized/bodied unsaturated oil with maleic anhydride followed by a further partial or complete reaction with an amine to form an amide.

15. The printing ink of claim 7, wherein said emulsion stabilizer is made by reacting unsaturated oil and/or polymerized/bodied unsaturated oil with maleic anhydride followed by a further partial or complete reaction with an alcohol to form an ester.

* * * * *